FIG.—1

Sept. 20, 1955     G. E. BOCK ET AL     2,718,197
TRACTION VEHICLE HAVING RAIL WHEELS AND ROAD WHEELS
Filed Nov. 24, 1950     7 Sheets-Sheet 2

INVENTORS.
George E. Bock and
BY   Victor H. Ames

ATTORNEY

Sept. 20, 1955 G. E. BOCK ET AL 2,718,197
TRACTION VEHICLE HAVING RAIL WHEELS AND ROAD WHEELS
Filed Nov. 24, 1950 7 Sheets-Sheet 3

INVENTORS.
George E. Bock and
Victor H. Ames
BY
W. H. Morey
ATTORNEY

INVENTORS.
George E. Bock and
Victor H. Ames
BY

ATTORNEY

Sept. 20, 1955     G. E. BOCK ET AL     2,718,197
TRACTION VEHICLE HAVING RAIL WHEELS AND ROAD WHEELS
Filed Nov. 24, 1950     7 Sheets-Sheet 5

*INVENTORS.*
George E. Bock and
Victor H. Ames
BY
ATTORNEY

Sept. 20, 1955   G. E. BOCK ET AL   2,718,197
TRACTION VEHICLE HAVING RAIL WHEELS AND ROAD WHEELS
Filed Nov. 24, 1950   7 Sheets-Sheet 6

*INVENTORS*
George E. Bock and
Victor H. Ames
BY

*ATTORNEY*

Sept. 20, 1955   G. E. BOCK ET AL   2,718,197
TRACTION VEHICLE HAVING RAIL WHEELS AND ROAD WHEELS
Filed Nov. 24, 1950   7 Sheets-Sheet 7

INVENTORS.
George E. Bock and
Victor H. Ames
BY
ATTORNEY

United States Patent Office 2,718,197
Patented Sept. 20, 1955

2,718,197

TRACTION VEHICLE HAVING RAIL WHEELS AND ROAD WHEELS

George E. Bock, Chicago, and Victor H. Ames, Midlothian, Ill., assignors to Whiting Corporation, a corporation of Illinois Application November 24, 1950, Serial No. 197,204

11 Claims. (Cl. 105—215)

Our invention refers to a lightweight rail traction vehicle adapted for movement either along tracks or on the ground and is a continuation-in-part of our co-pending application for Letters Patent Serial No. 164,226, filed May 25, 1950.

For many years industry has been faced with the problem of economically moving railway cars in shops and yards. Switching locomotives of conventional design are generally satisfactory for this purpose, but if sufficiently heavy to provide the necessary tractive effort, command a high initial price and are quite expensive to operate and maintain. In addition, it is frequently necessary to install several rail switches in the yard or shop to obtain the necessary flexibility of movement between tracks. Fixed car winches of various types have been employed for moving cars along relatively short straight sections of track, but are not inexpensive and lack the flexibility of movement required for a satisfactory solution of the problem. Hand levers, sometimes employed for inching cars along the track, are obviously slow and of limited capacity.

One of the primary objects of our invention is the provision of a lightweight, relatively inexpensive rail traction vehicle capable of developing when coupled to a railway car a tractive effort greatly in excess of the tractive effort attributable to its own weight, and which is provided with both road wheels and rail wheels, thus permitting movement of the vehicle between tracks, along tracks, or on a road.

Other important objects of our invention include the provision of a vehicle of the type described incorporating a novel and useful arrangement of rail and road wheels, improved road wheel steering means, improved apparatus for transferring in part the weight of a railway car to our vehicle, and improved mechanism for driving the wheels.

Other objects, pertaining to novel and improved components and arrangements thereof, will be disclosed in detail in the following description and in the appended drawings, in which.

In brief, our vehicle utilizes a rigid frame pivotally supporting a rigid coupler for movement about an upright axis. The coupler is provided with a head for draft engagement with a standard railway car coupler and in its preferred form includes a rigid member disposed below the head for engagement with the lower face of the car coupler. Means are provided for raising this rigid member with respect to the car coupler after the coupler is in draft engagement with the head, the effect of this movement being to transfer a portion of the weight of the railway car to our vehicle and thereby greatly increase its tractive effort.

Rail wheels are journaled to our vehicle frame and are spaced longitudinally from the head in the opposite directions to insure that a portion of the weight transferred to our vehicle is borne by each wheel and that any danger of tipping is eliminated. An internal combustion engine of conventional design is carried by the frame and coupled to the wheels for driving the vehicle.

In addition to the rail wheels, which are aligned for moving the vehicle longitudinally along a track, we provide a set of retractable road wheels for moving the vehicle laterally. The road wheels are spaced laterally in opposite directions from the head and are capable of being lowered a distance sufficient to raise the rail wheels and their flanges clear of the tracks. Thus, when the road wheels are in raised position the entire weight of the vehicle is carried by the rail wheels; and conversely, when the road wheels are in lowered position, they support the vehicle. Means are provided for steering the road wheels in a manner similar to automotive vehicles, thus permitting our vehicle to move across a series of tracks or along the road, as desired. Drive means coupled to the engine are provided for driving the rear pair of road wheels, this drive connection being broken when the wheels are in raised position.

As an alternative to the above-described preferred form of structure, we may provide a vehicle wherein the road wheels are fixed with respect to the frame and the rail wheels are retractably mounted thereon. This type of structure will to a certain extent simplify the necessary road wheel steering connections and eliminates the necessity of a jack for moving the member below the coupler head upwardly. However, the stresses developed in such a structure are in many instances of considerable magnitude, requiring the use of heavier and more expensive components. As a result, we prefer to utilize the previously-described structure wherein the rail wheels are journaled directly on the frame and a jack is provided for moving the member upwardly into engagement with the car coupler.

Since a substantial portion of the weight of the freight car to which our vehicle is attached can be easily transferred to our vehicle, it is clear that the tractive effort of which our vehicle is capable greatly exceeds that which can be attributed to its own weight. In addition, the ability of our vehicle to move across a series of tracks or along a road saves a great deal of time in shop or yard and will frequently eliminate the necessity for many of the switches otherwise conventionally employed. By disposing the road wheels laterally with respect to the rail wheels, the problem of placing the vehicle on a track and removing it therefrom is greatly simplified.

Figure 1:
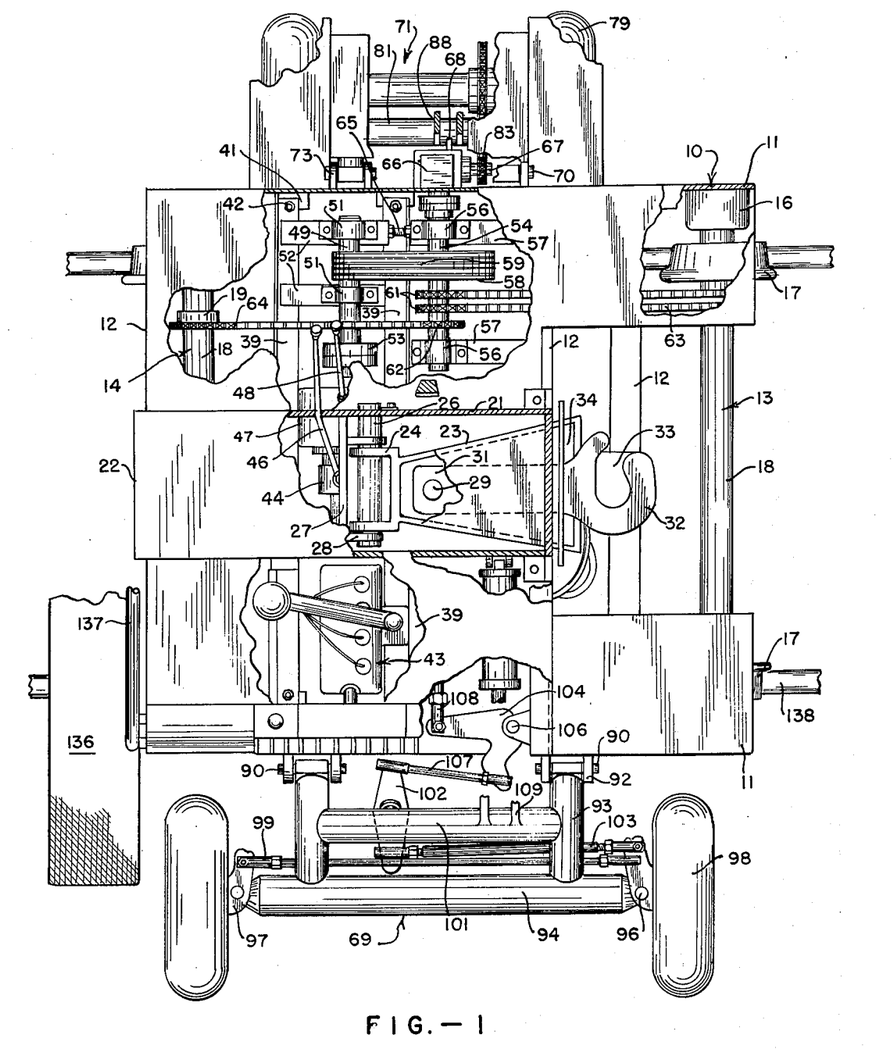
Fig. 1 is a partially broken away plan view of a preferred form of our vehicle.

For a more detailed description of our vehicle, reference is made to Fig. 1 in which we have illustrated a preferred form of our invention utilizing a rigid frame, generally designated 10. The frame 10 is of generally rectangular confirmation utilizing a pair of parallel edge beams 11, suitably connected by a plurality of transverse beams 12. A pair of rail wheel units 13 and 14 are journaled in suitable journal boxes 16 secured to the edge beams 11 near the ends of the frame 10, each rail wheel unit including a pair of rail wheels 17 and a transverse axle 18 secured to the wheels. Each of the axles 18 is provided with one or more sprocket wheels 19 for driving the axles 18 and wheels 17.

A heavy hollow box-like member 21 is secured to the upper surfaces of transverse beams 12 and extends longitudinally of the vehicle. A heavy bumper pad 22 is secured to a closed end of the member 21, the opposite end being open for receiving a housing 23. The inner end of the housing 23 is closed and is secured to a clevis 24, which pivotally engages a transverse, generally horizontal bar 26 suitably supported in the member 21 as by a reinforcing plate 27 secured within the member 21 and ears 28 welded to the plate 27 and engaging the bar 26.

An upright pivot pin 29 extends through the housing 23 and pivotally supports a rigid coupler tongue 31, which extends outwardly beyond the housing 23 and terminates in a coupler head 32 shaped for draft engagement with a conventional railway car coupler. In its preferred form a flat rigid member 33 is secured to the head 32 and tongue 31 immediately below the head 32 and car coupler when the head 32 is moved upwardly after the coupler and head 32 have been engaged. The lower outer surface of the housing 23 may be provided with a bearing block 34 adapted to slidably support the tongue 31 and head 32.

The head 32 is disposed between the rail wheel units 13 and 14 and is preferably disposed as closely to the center of the vehicle as is possible in order that the load transferred from the railway car to our vehicle will be distributed as evenly as possible between the rail wheels 17. This not only increases the maximum tractive effort of which our vehicle is capable, but also eliminates any tendency towards tipping such as might be experienced in the event the head 32 were disposed immediately above one of the axles 18, or outwardly therefrom. A jack, generally designated 36 (Fig. 2), preferably in the form of a double-acting hydraulic cylinder 37 having an upwardly extending piston rod 38, is pivotally secured to one of the transverse beams 12 immediately below the end of the housing 23.

Figure 2:
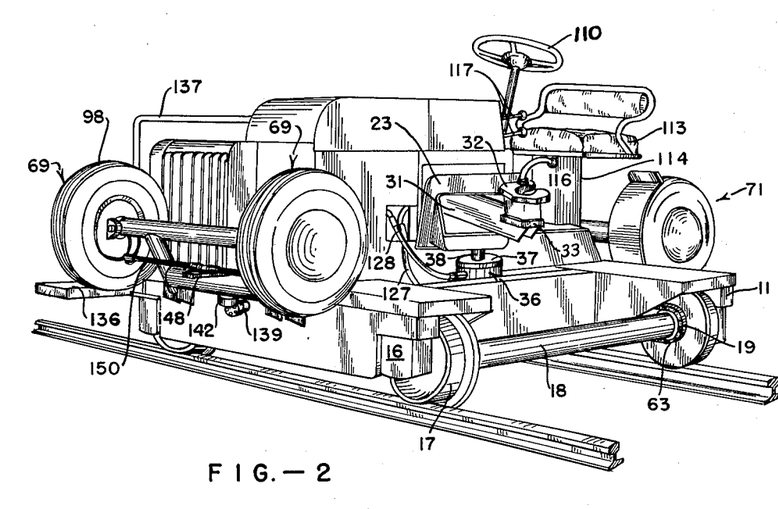
Fig. 2 is a perspective view of our vehicle utilizing a modified form of road wheel steering gear.
Figure 3:
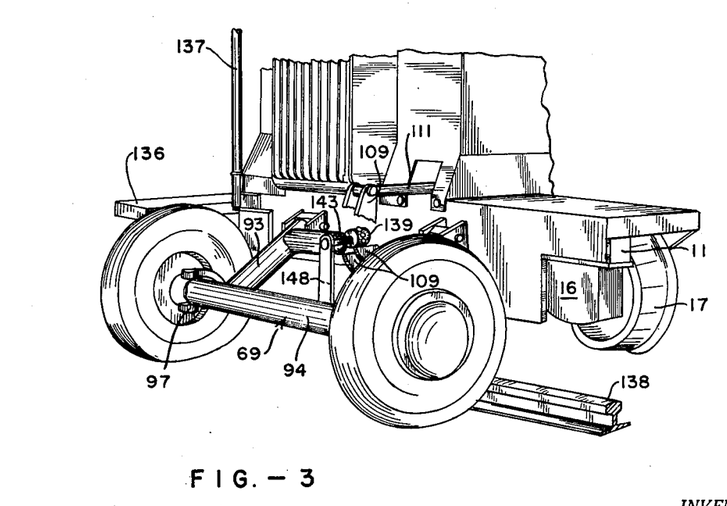
Fig. 3 is a partial perspective view of the device shown in Fig. 2 with the road wheels lowered.
Figure 4:
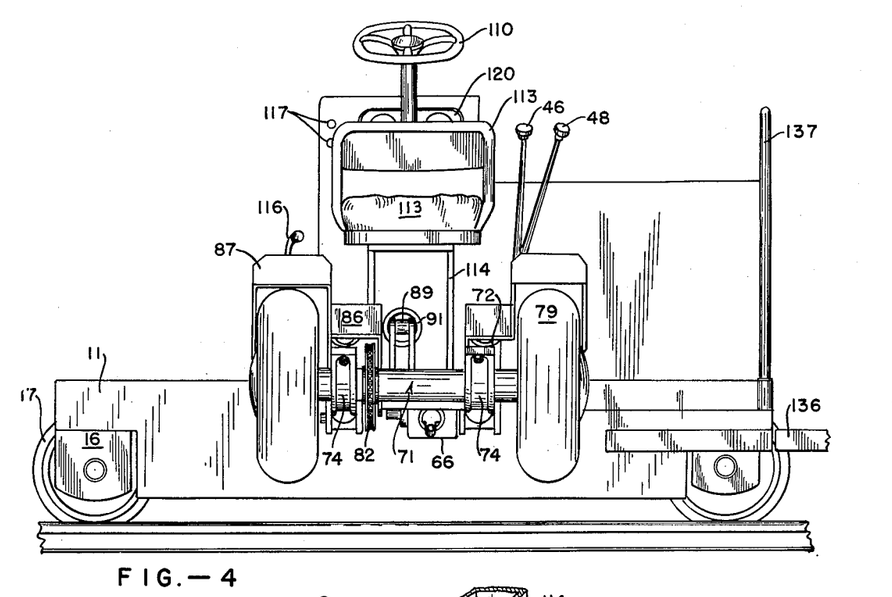
Fig. 4 is a rear elevation of the device shown in Fig. 2.
Figure 5:
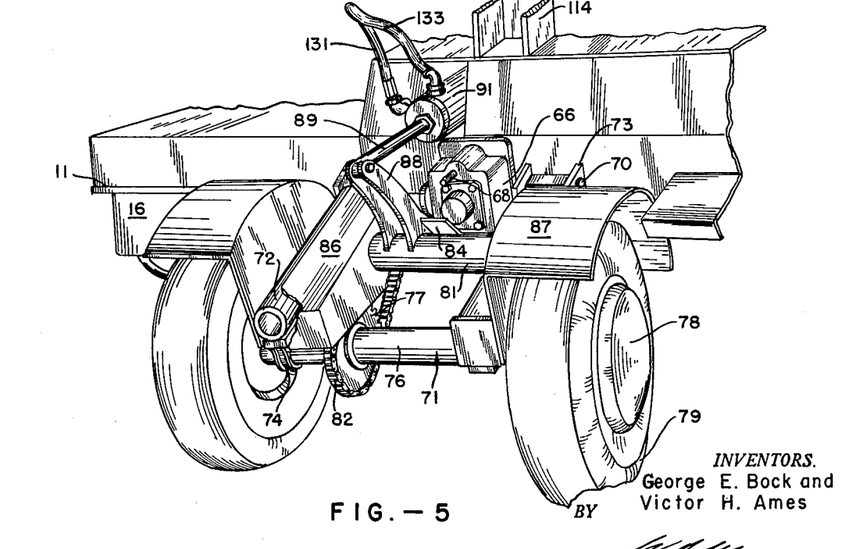
Fig. 5 is a partial perspective view of the rear portion of our vehicle.
Figure 6:
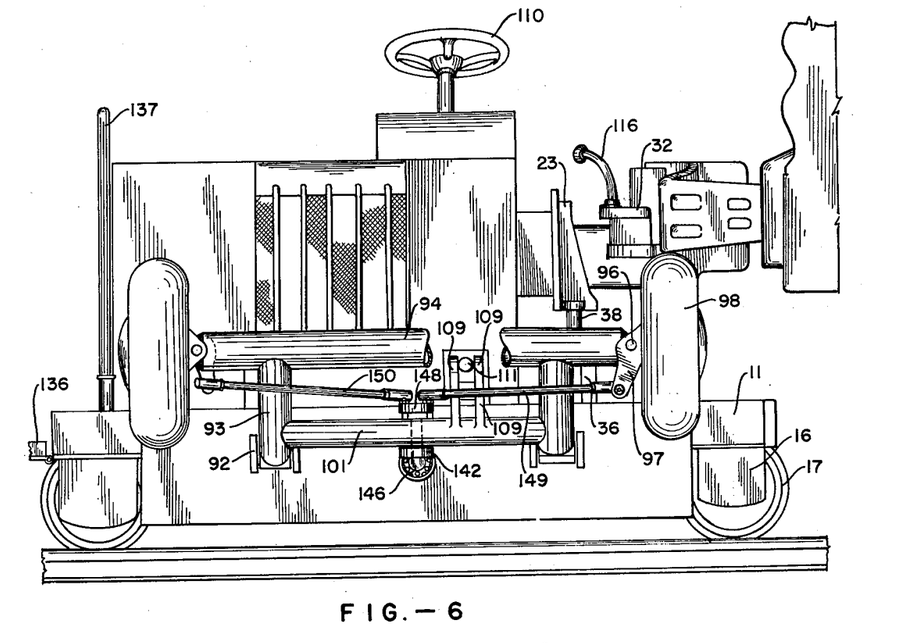
Fig. 6 is a front elevation of the vehicle shown in Fig. 2.
Figure 7:
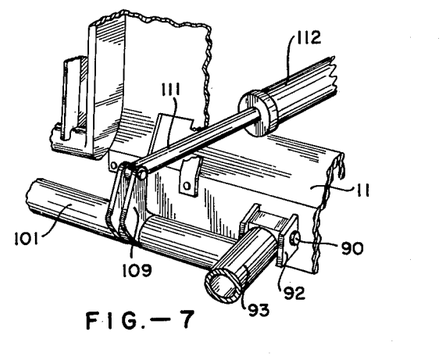
Fig. 7 is a partial perspective of the front road wheel retracting apparatus.

The upper end of the piston rod 38 is pivotally secured to the lower surface of the housing 23 in such manner that as the jack 36 is actuated, the housing will be forced upwardly, pivoting about the pin 26. This forces the tongue 31 and head 32 upwardly, bringing the plate 33 into engagement with the lower face of the car coupler, but does not prevent the tongue 32 from swinging about the upright pin 39.

Parallel transverse supports 39 are each secured at one end to one of the edge beams 11. The opposite ends of the supports 39 rest on horizontally disposed brackets 41 secured to the other of the edge beams 11. Loosely fitting bolts 42 may be provided for preventing accidental displacement of the supports 39 from the brackets 41. A suitable internal combustion engine 43 of conventional design is mounted on the supports 39 and connected through a conventional clutch (not shown) to a suitable reverse gear 44 having a control lever 46, the reverse gear 44 being in turn connected to a conventional four-speed automotive type of sliding gear transmission 47 having a control lever 48. The transmission 47 is coupled to a drive shaft 49, journaled in bearings 51, which are in turn supported by longitudinal members 52 extending between the supports 39. A suitable brake drum 53 may be secured to the shaft 49.

A countershaft 54 parallel to the drive shaft 49 is journaled in bearings 56, which are in turn secured to cantilever beams 57 each fastened at one end to one of the transverse beams 12. Sprocket wheels, indicated at 58, are secured to the shafts 49 and 54 and are connected by heavy duty driving chains 59. Sprocket wheels 61 and 62 are secured to the countershaft 54 for driving chains 63 and 64, the latter being trained over the sprockets 19 on the axles 18. A tensioning screw 65 is threaded into the cantilever beam 67 supporting the rear bearing 56 and abuts bearing 51 or supports 52 in such manner that upon rotation of the tensioning screw 65 the rear ends of the supports 39 will be forced to the left, as in Fig. 1, thus imparting tension to the chains 59. The bolts 42 may be loosened during this operation and subsequently secured.

The end of the shaft 54 is coupled to a bevel gear assembly 66 secured on the outside of one of the edge beams 11. The bevel gear assembly 66 includes a longitudinally disposed output shaft 67 and an internal positive clutch controlled by a laterally projecting reciprocal pin 68, the latter being urged by an internal spring (not shown) into its outermost engaged position. Thus, when outward movement of the pin 68 is unobstructed, the output shaft 67 will be driven from the countershaft 59.

A set of retractable road wheels consisting of a forward wheel unit, generally designated 69, and a rear wheel unit, generally designated 71, are secured to the frame 10 for moving our vehicle laterally or transversely. The rear wheel unit 71 includes a pair of spaced parallel rigid members 72 pivotally secured at their inner ends by pins 70 to brackets 73 fastened to the external surface of one of the edge beams 11 in such manner that the pins 70 define a substantially horizontal axis. Bearings 74 are secured to the member 72 near the free ends and rotatably support an axle 76 to which is fixed a sprocket wheel 77.

Rear wheels 78, preferably provided with pneumatic tires 79 are secured to the axle 76 outwardly from the members 72. A cross member 81 connects the members 72 between the axle 76 and the pins 70. A chain 82 extends over the sprocket wheel 77 and over a sprocket wheel 83 secured to the output shaft 67, the latter being disposed on the axis of the pins 70. An arm 84 extends upwardly from the cross member 81 and is disposed in such manner as to engage the pin 68 when the rear wheel unit 71 is raised, thereby disengaging the output shaft 67 from the countershaft 59. A chain guard 86 and fenders 87 may be secured to the members 72, if desired.

Arms 88 secured to the cross member 81 extend upwardly into pivotal engagement with the outer end of a piston rod 89 suitably mounted in a double-acting fluid cylinder 91, which is in turn pivotally secured to the frame 10 and is disposed in an approximately horizontal position. Thus, actuation of the cylinder 91 by the application of suitable fluid pressure serves to raise and lower the rear wheel unit 71.

The front wheel unit 69 is secured in similar manner by aligned pivot pins 90 extending through brackets 92 fixed to the opposite edge beam 11 for movement about a substantially horizontal axis. Rigid members 93, similar to the members 72, extend radially outwardly from the pins 90 and are secured at their outer ends to a transverse axle 94. Kingpins 96 are provided at the extremities of the axle 94 for pivotally supporting arms 97 to which front road wheels 98 are journaled. The arms 97 are connected by a conventional adjustable steering link 99. A rigid cross member 101 connects the members 93 between the axle 94 and the brackets 92 and pivotally supports a lever 102. An arm 103 pivotally connects one end of the lever 102 with one of the arms 93 in conventional manner, the usual ball and socket type of connection being employed for this purpose. A bell crank 104 is pivotally secured near its midpoint to a bracket 106 for movement about an upright axis. A rod 107 is pivotally secured at one end to a laterally projecting arm of the bell crank 104 and its opposite end to the lever 102. The conventional ball and socket joint by which the rod 107 is secured to the lever 102 should be disposed as closely as possible upon the axis of the pins 90, in order to avoid steering movement of the wheels 92 as the unit 69 is raised or lowered. The longitudinally extending arm of the bell crank 104 is pivotally connected by a rod 108 to the pitman arm of a conventional steering gear, which is in turn controlled by a steering wheel 110 projecting upwardly through the frame 10 rearwardly from the member 21.

Pivotally extending arms 109 are fixed at one end to the cross member 101 and are pivotally secured at their upper extremities to the outer end of a piston rod 111 reciprocally mounted in a double-acting fluid cylinder 112, which is in turn pivotally secured to the frame 10 in such manner that reciprocation of the rod 111 raises and lowers the front wheel unit 69 in a manner similar to that employed in raising and lowering the rear wheel unit 71.

A seat 113 for the operator is mounted on a column 114 secured to the frame 10 near the rear road wheel unit 71 in such position that the operator may grasp a flexible handle 116 secured at one end to the head 32.

Valve control levers 117 project outwardly from a dashboard 120 towards the operator and control the flow of working fluid to and from the cylinders 36, 91, and 112.

Figure 9:
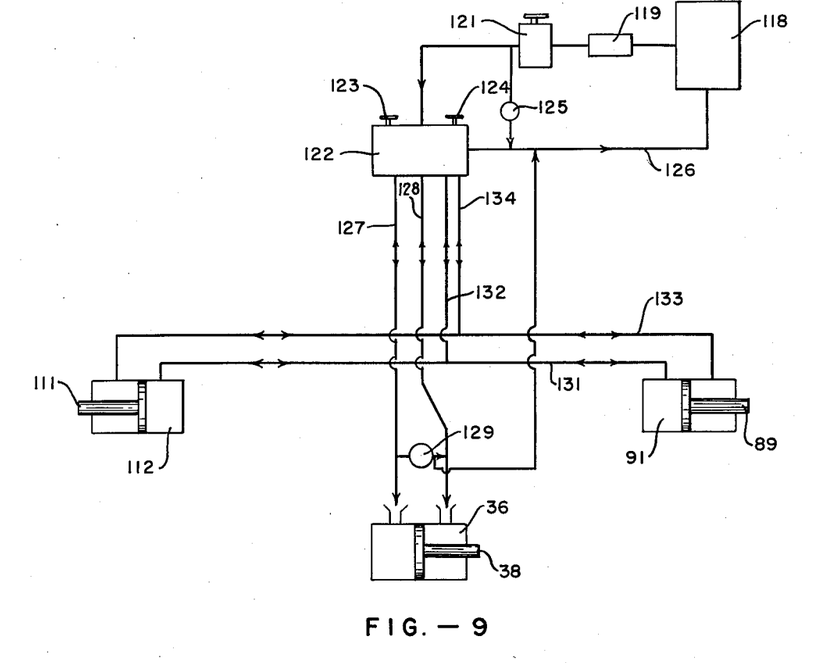
Fig. 9 is a diagrammatic sketch of the hydraulic circuit preferably utilized in our vehicle.

The hydraulic system is disclosed diagrammatically in Fig. 9 and includes a reservoir 118 having an outlet communicating with a filter 119, which in turn communicates with a pump 121 driven by the engine 43. The pump outlet is connected to a valve chest 122 of conventional design having a valve 123 for controlling the flow of fluid under pressure to the cylinder 36 and a valve 124 for controlling the flow of working fluid to the cylinders 91 and 112, which are operated simultaneously. A pressure relief valve 125 connects the outlet of the pump 121 with a return line 126, which also connects the valve chest 122 with the reservoir 118. More specifically, conduits 127 and 128 interconnect the valve chest 122 with the lower and upper portions of the cylinder 36, respectively, the valve 123 being utilized to divert fluid under pressure from the pump 121 into one or the other of these conduits, the conduit not under pressure acting as a return and communicating under such circumstances with the conduit 126. A relief valve 129 interconnects the conduits 127 and 126 and acts to relieve pressure in excess of a predetermined maximum developed in the lower portion of a cylinder 36 by permitting discharge into conduit 126. The pressure at which relief valve 125 opens should be greater than the pressure required for opening relief valve 129.

The inner portions of the cylinders 91 and 112 are interconnected by conduit 131, which in turn communicates with a conduit 132 connected to the valve chest 122. The outer portions of the cylinders 91 and 112 are interconnected by the conduit 133, which communicates with the conduit 134, the latter terminating at the valve chest 122. Valve 124 controls the flow of fluid through the conduits 131–134, inclusive, in a manner similar to that previously described. The valves 123 and 124 are connected to the controls 117, thereby permitting the operator to raise or lower the front and rear wheel units 69 and 71 by operation of the valve and to raise or lower the piston rod 38 by operation of valve 123, as desired. It will be understood that when both the valves 123 and 124 are closed, fluid is locked in the conduits 127, 128, 132, and 134, thus holding the several pistons in position, and the pump discharges through the valve chest 122 into conduit 126. Other components and hydraulic or pneumatic systems may be substituted for that above described, if desired.

The usual engine and transmission controls are disposed in conventional manner for access by an operator in the seat 113. A running board 136 is hinged to the end of the car opposite the head 32 for the convenience of a switchman. A hand rail 137 may be secured to the frame 10 near the running board 136, if desired.

In operation, assuming the road wheels to be in their lowered position and the engine 43 operating, it will be seen that our vehicle can be maneuvered in a manner similar to a conventional automobile. Since the road wheels are lowered, the arm 84 will not be in engagement with the clutch pin 68, and power will therefore be transmitted from the drive shaft 49, through the countershaft 54 and the bevel gear assembly 66, to the chain 82 driving the rear wheels. The vehicle may be maneuvered, as by driving the road wheels laterally across a track, indicated at 138, to position the rail wheels 17 directly over the track. Operation of the valve 124 retracts the road wheels, moving them arcuately upwardly to the limit of the stroke of the cylinders 91 and 112, or to suitable stops. This lowers the rail wheels 17 into engagement with the track 138 and also disengages the road wheels from the ground. Since the steering connection between the lever 102 and the rod 107 is disposed on the axis about which the front wheel unit moves, the front wheels 98 will remain in their original position. As the rear road wheel unit rises, the arm 84 engages the pin 68, disconnecting the output shaft 67 from the countershaft 54. Therefore, the road wheels will not be driven while in raised position. The rail wheels 17, however, are constantly driven through the countershaft 54 regardless of whether the road wheels are raised or lowered.

When the road wheels have been raised the vehicle can be moved along the track 138 to a railway car having a standard coupler, which is engaged in conventional manner with a head 32. When properly engaged, the rigid member 33 will be disposed below the lower surface of the car coupler. The operator then opens valve 123, generating a predetermined maximum pressure in cylinder 36 and forcing the piston rod 38 and housing 23 upwardly, thereby bringing the member 33 into engagement with the lower surface of the coupler. This transfers a portion of the weight of the freight car to our vehicle and increases its tractive effort. The valve 123 is then closed, it being understood that any excessive pressure developed in the lower portion of cylinder 36 will be relieved by valve 129, regardless of the position of valve 123. The levers 46 and 48 are then moved to suitable position and the freight car either pushed or pulled by our vehicle, as desired.

To release the freight car, valve 123 is reversed, thus lowering the piston rod 38 and member 33, the couplers then being disengaged in conventional manner. To remove our vehicle from the tracks, or to move it along a road or between tracks, the valve 124 is actuated in such manner as to force the fluid under pressure into conduits 132 and 131, which actuates the cylinders 91 and 112 in such direction as to force the road wheels downwardly. These wheels travel downwardly a distance sufficient to raise the rail wheels 17, together with their flanges, well above the tracks 138. As the rear wheel unit 71 is lowered, the arm 84 becomes disengaged from pin 68, which moves outwardly under spring pressure, engaging the internal clutch and connecting the output shaft 67 with the countershaft 54. The steering connection illustrated in Fig. 1 constitutes a preferred embodiment, but can be varied as a form of universal joint illustrated in Fig. 8. This joint consists essentially of a hollow housing 139 rotatably supporting a shaft 141 and pivotally secured below its axis to a housing 142, similar to housing 139, which rotatably supports an output shaft 143. Within each of the housings 139 and 142 are cylindrical members 144 and 146 secured to the shafts 143 and 141, respectively. The faces of the members 144 and 146 are provided with a series of pockets adapted to receive balls 147, the pockets being formed around the peripheries of the members 144 and 146 at approximately 45 degrees to the axis of each of the shafts. The balls are permanently secured in each alternate opening in such manner as to mesh each with the other and to permit angular movement of the housing 142 with respect to the housing 139 without breaking the driving connection formed between the two cylindrical members 144 and 146.

Figure 8:
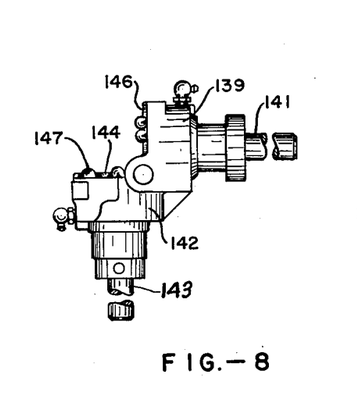
Fig. 8 is a diagrammatic elevation of the universal steering connection partially shown in Fig. 6.

The housing 139 is secured to one of the edge beams 11, the shaft 141 being connected to the steering wheel 110 by conventional gearing for rotational movement. The housing 142 is secured to the cross member 101, the shaft 143 extending through the member 101 and being secured at its opposite end to an arm 148, the lower end of which is pivotally attached to a pair of rods 149 and 150 attached at their opposite ends to the steering arms 97 by the conventional ball and socket steering connections. The pivotal connection between the housings 139 and 142 is preferably disposed on the axis about which the wheel assembly 69 moves.

Figures 10, 11:
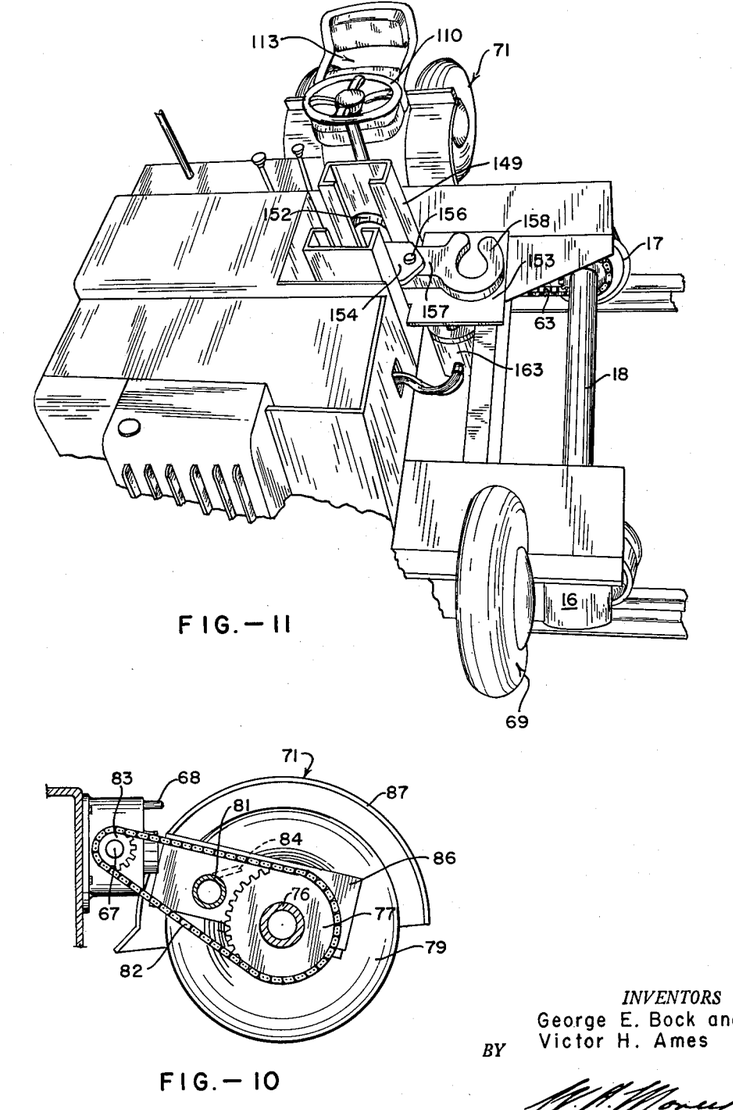
Fig. 10 is a vertical cross section through a portion of the rear road wheels utilized on the vehicle illustrated in Fig. 2.
Fig. 11 is a partial perspective view of a modified form of our vehicle incorporating a novel coupler-elevating device.
Figure 12:
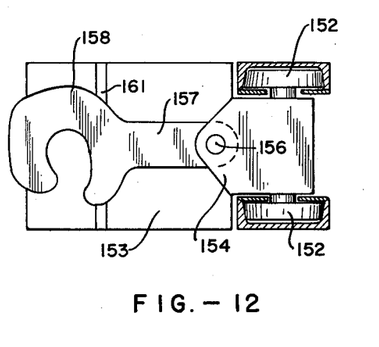
Fig. 12 is a plan view of the coupler-elevating device shown in Fig. 11.
Figure 13:
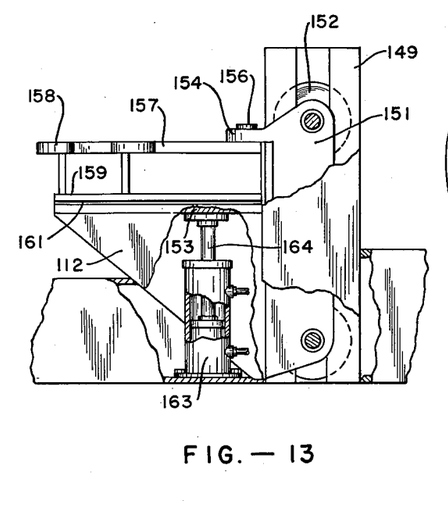
Fig. 13 is a partially broken away elevation of the device shown in Fig. 12.

The use of a coupler and housing pivotally secured to the frame for movement about both a horizontal and vertical axis is not in every instance essential. As illustrated in Figs. 11–13, the entire coupler assembly may alternatively be made vertically movable provided the coupler is supported for movement about an upright axis. When it is desired to utilize a structure of this type, we secure a pair of opposed parallel channel members 149 to the transverse beams 12 of the frame, usually approximately at the location of the pin 26. A heavy carriage 151 is mounted on four spaced wheels 152 disposed within the channel members 149 for vertical movement. A flat, relatively wide horizontal member 153 projects outwardly from the carriage 151 in substantially horizontal plane and is spaced downwardly from a bracket 154, which is also secured to or formed integrally with the carriage 151. An upright pin 156 extends through openings formed in the bracket 154 and the horizontal member 153, pivotally securing a coupler tongue 157 in position. The outer end of the tongue 157 is secured to a head 158 similar to head 32 and which preferably includes a rigid member 159 similar to member 33. A bearing block 161 is disposed on the member 153 below the member 159 and supports the head for pivotal movement in a horizontal plane. Triangular members 162 are secured to the member 153 and to the carriage 151 in spaced parallel relation, projecting outwardly through the opening defined by the spaced channel members 149. A suitable jack, such as a double acting hydraulic cylinder 163 having an upwardly extending piston rod 164, is carried by the frame below the member 153, the rod 164 projecting upwardly between the reinforcing members 162 into engagement with the member 153. Thus, as pressure fluid is admitted to the lower portion of the cylinder 163, the entire assembly will be forced upwardly, bringing the member 159 into engagement with the lower face of a car coupler.

Figure 14:
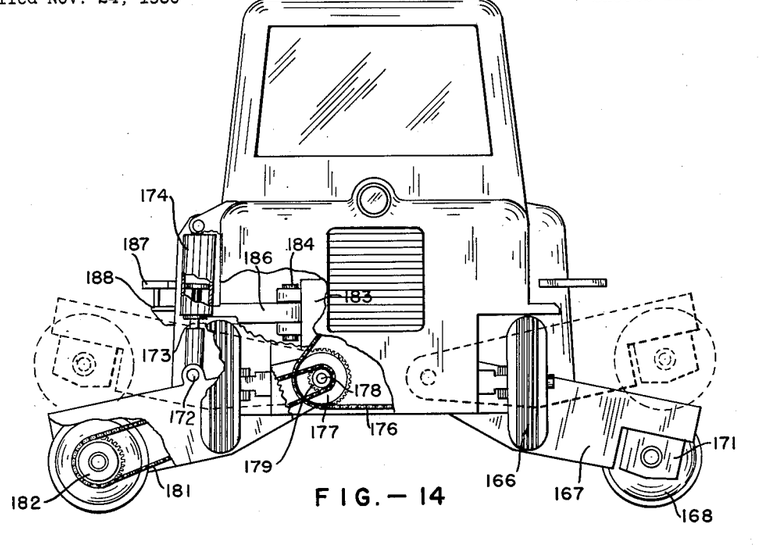
Fig. 14 is a partially broken away elevation of a modified form of our device utilizing retractable rail wheels.
Figure 15:
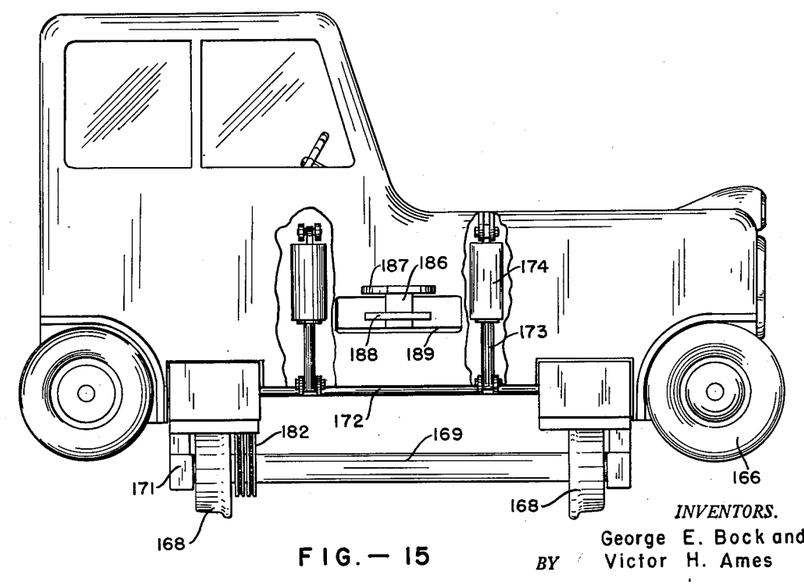
Fig. 15 is a side elevation of the device shown in Fig. 14.

As previously mentioned, it is not in every instance necessary that the road wheels constitute the retractable set of wheels on our vehicle. By way of illustration, our vehicle as shown in Figs. 14 and 15, may employ a rigid vehicle frame supporting an engine and providing a driver's compartment. Road wheels, generally designated 166, may be mounted on the frame in conventional manner following automotive practice, one pair of the wheels pivotally supported for steering. Two pairs of rigid arms 167 are pivotally secured to the frame and project longitudinally therefrom on opposite sides. Rail wheels 168 are fixed to axles 169 rotatably supported by journal boxes 171 secured to the outer ends of the arms 167. The arms 167 are interconnected by cross members 172 to which piston rods 173 are pivotally secured. The rods 173 are reciprocally mounted in cylinders 174, the latter in turn being pivotally secured to an elevated portion of the vehicle frame. It is usually preferable to employ a cylinder for each of the four arms, since the load transmitted from the rail wheels 168 to the vehicle frame is frequently substantial. The cylinders 174 are preferably double-acting and are similar to cylinders 91 and 112, previously described, although in most instances of considerably greater diameter. A chain 176 extends over a drive sprocket (not shown) driven from the engine over sprockets 177 journaled on shafts 178 about which the arms 167 pivot. Sprockets 179 are secured to sprockets 177 and engage drive chains 181, which in turn drive sprockets 182 secured to the axles 169.

A strong upright member 183 is secured to the vehicle frame and carries an upright pivot pin 184, which pivotally engages an end of the coupler tongue 186. A head 187 similar to head 32 is secured to the outer end of the tongue 186 and includes a member 188 similar to member 33. The lower surface of the tongue 186 and head 187 slidably engage a fixed bearing block 189, thereby permitting horizontal movement of the head 187. The coupler tongue 186 and head 187 project longitudinally beyond the body for engagement with a railway car coupler in a manner similar to that described.

In operation, the arms 167 are raised by operation of the cylinders 174 when the vehicle is traveling along a road or across tracks. When it is desired to move the vehicle along tracks, the vehicle is positioned transversely to the tracks and the arms 167 lowered, engaging the wheels 168 with the track and raising the road wheels 166 out of engagement with the ground. The coupler head 187 is then brought into draft engagement with a railway car coupler and the cylinders 174 again actuated to raise the entire vehicle to a somewhat greater elevation. This brings the member 188 into engagement with the lower face of the car coupler and transfers a portion of the weight of the railway car to the vehicle.

Disengagement of our vehicle from the railway car and removal from the tracks is accomplished by a reversal of these operations.

In this form of device, it will be noted that the means employed for raising and lowering the rail wheels are also utilized for raising and lowering the coupler, which is not mounted for movement about a horizontal axis. This to a certain extent simplifies the hydraulic system, but requires that the cylinders 174 transmit a heavy load, which is sometimes undesirable.

From the foregoing it will be apparent that our vehicle, although relatively light in weight and inexpensive, is capable of developing a tractive effort far in excess of the tractive effort attributable to its own weight and that it constitutes a highly flexible apparatus for moving railway cars along tracks in a yard or shop. The ability of our vehicle to move along roads at reasonable speeds also contributes considerably to its utility, since one vehicle may in some instances adequately service a number of plants. In addition, the usual crew may consist of a switchman and an operator, or if necessary only an operator.

It is clearly feasible to vary many of the details herein described without departing from our invention. For example, the member disposed below the coupler head for engagement with the lower face of a car coupler need not necessarily be secured to the head, but may be independently mounted for vertical movement, if desired. We do not therefore limit ourselves to the details herein described, except insofar as incorporated in the appended claims.

I claim:

1. A traction vehicle comprising a rigid frame, a first set of wheels journaled on the frame for moving the vehicle longitudinally, a second set of wheels on the frame for moving the vehicle laterally including first and second wheel units, the axis of rotation of the first set of wheels being at substantially right angles to the axis of rotation of the wheels of at least one unit of the second set of wheels, means secured to the frame and to the second set of wheels for forcing said wheels from a raised position wherein the first set of wheels supports the frame to a lowered position wherein the second set of wheels supports the frame and means including an engine for driving at least one wheel of each set.

2. A vehicle comprising a rigid frame, a set of rail wheels and a set of road wheels on the frame, each of said sets including two wheel units, the axis of rotation of the rail wheels being disposed at substantially right angles to the axis of rotation of the wheels of at least one unit of said set of road wheels, arms pivotally connecting the wheel units of one of said sets of wheels to the frame for movement about generally horizontal axes, jack means carried by the frame and engaging the pivotally mounted wheel units for raising and lowering said units a distance sufficient to transfer support of the frame from one set of wheels to the other, means for steering the wheels of one of the road wheel units and means carried by the frame for driving at least one wheel of each set of wheels.

3. A rail traction vehicle comprising a rigid frame, a set of rail wheels and a set of road wheels on said frame, each of said sets including two wheel units, the axis of rotation of the rail wheels being disposed at substantially right angles to the axis of rotation of the wheels of at least one unit of said road wheel units, arms pivotally connecting the wheel units of one of said sets of wheels to the frame for movement about generally horizontal axes, means carried by the frame and engaging the pivotally mounted wheel units for raising and lowering said units a distance sufficient to transfer support of the frame from one set of wheels to the other, means for steering the wheels of one of the road wheel units and means on the frame for driving at least one wheel of each set of wheels.

4. A rail traction vehicle comprising a generally rectangular frame, a set of rail wheels journaled to the frame, a set of road wheels including a fixed road wheel on a first axle and a steerable road wheel on a second axle, the axis of rotation of the fixed road wheel being disposed at substantially 90° to the axis of rotation of the rail wheels, laterally extending road wheel support arms pivotally secured to the frame and means on the frame engaging said arms for forcing said road wheels from a raised to a lowered position.

5. A rigid generally rectangular frame, two spaced pairs of rail wheels journaled on the frame for moving the vehicle along a track, a set of road wheels on the frame for moving the vehicle along a road, said set of road wheels including a first road wheel mounted for steering movement about an upright axis and journaled on a first axle and a second road wheel mounted on a second axle for rotation about a horizontal axis disposed at approximately 90° to the axis of rotation of said rail wheels, means for steering the first of said road wheels, arms pivotally securing said road wheels to the frame for movement about substantially horizontal axes, jack means on the frame for forcing said road wheels downwardly below the rail wheels, and means for driving at least one of said rail wheels and one of said road wheels.

6. The structure defined in claim 1, wherein the second set of said wheel units comprises rigid axle means, wheels journaled on the axle means, rigid transverse arms secured to the axle means, pivot means securing the arms to the frame for movement about a substantially horizontal axis, a steering link connecting the wheels, a first lever having a fulcrum fixed with respect to the arms, means including a first rod pivotally coupling an end of the lever to the link, a second lever pivoted to the frame, and a second rod pivotally linking the first and second levers, the connection between the first lever and second rod being disposed substantially on said horizontal axis.

7. The structure defined in claim 1 wherein the second set of said wheel units comprises axle means, wheels journaled on the axle means, rigid transverse arms supporting the axle means, pivot means securing the arms to the frame for movement about a substantially horizontal axis, steering arms coupling the wheels and a universal joint for moving the steering arms including a member supported by the frame, a second member pivoted to the first member, and an output shaft carried by the second member and coupled to said arms, the pivot between the first and second members being disposed substantially on said horizontal axis.

8. The structure defined in claim 1, wherein the second of said wheel units includes a rigid arm, axle means on the arm, a wheel on the axle means, means pivotally securing the arm to the frame for movement about a substantially horizontal axis, a driving shaft, a driven shaft, means coupling the driven shaft to a wheel, and means actuated by a member movable with the axle for disconnecting the driving shaft from the driven shaft when said axle is in raised position.

9. A rail traction vehicle comprising a rigid frame, a set of road wheels on the frame for moving the vehicle along a road, said road wheels including at least one wheel mounted on a first axle and having a fixed generally horizontal axis of revolution and a second road wheel mounted on a second axle for steering movement about an upright axis, arms pivoted to the frame and projecting longitudinally from opposite sides of the vehicle, rail wheels journaled to said arms for rotation about axes disposed at substantially 90° to the axis of rotation of said fixed road wheel, jack means on the frame engaging the arms for forcing said arms upwardly and downwardly and thereby transferring support of the vehicle between rail wheels and road wheels, means for driving at least one of the road wheels and one of the rail wheels, a longitudinally disposed rigid coupler pivoted to the frame for movement about an upright axis, said coupler having a head for draft engagement with a railway car coupler, a member below the head for movement about an upright axis and means fixed to the frame for supporting said head and member whereby said coupler head will be forced upwardly against said railway car coupler when said rail wheels are lowered.

10. A vehicle comprising a rigid frame, a set of four rail wheels journaled on the frame for rotation about parallel axis, a set of road wheels including first and second pairs of road wheels, at least said first pair of road wheels being disposed for rotation about an axis at approximately 90° to the axis of rotation of said rail wheels, a steering device on the frame coupled to the said second pair of road wheels, rigid arms supporting said road wheels and pivotally secured to the frame for movement about generally horizontal axes, jack means on the frame for forcing said road wheels downwardly and means including an engine on the frame for driving at least two of said rail wheels and the first of said pairs of road wheels.

11. A vehicle comprising a rigid frame, a set of rail wheels and a set of road wheels on the frame, each of said sets including at least two wheel units, said rail wheels being disposed for rotation about an axis at right angles to the axis of rotation of the wheels of at least one of the road wheel units, arms pivotally connecting the wheel units of one of said sets of wheels to the frame for movement about generally horizontal axes, power actuated means carried by the frame and engaging the pivotally mounted wheel units for raising and lowering said units a distance sufficient to transfer support of the frame from one set of wheels to the other set, means for steering the wheels of one of the road wheel units and means on the frame for driving at least one wheel of each set of wheels.

(References on following page)

References Cited in the file of this patent

UNITED STATES PATENTS

| | | |
|---|---|---|
| 1,342,761 | Richardson | June 8, 1920 |
| 1,595,420 | Robb | Aug. 10, 1926 |
| 1,742,154 | Vernon | Dec. 31, 1929 |
| 1,862,429 | Rivkin | June 7, 1932 |
| 1,975,525 | Wilcox | Oct. 2, 1934 |
| 1,989,639 | Keen et al. | Jan. 29, 1935 |
| 2,057,230 | Callison et al. | Oct. 13, 1936 |
| 2,487,572 | McKee et al. | Nov. 8, 1949 |
| 2,562,203 | Metzger | July 31, 1951 |

FOREIGN PATENTS

| | | |
|---|---|---|
| 70,229 | Switzerland | Jan. 22, 1914 |
| 88,144 | Austria | Apr. 25, 1922 |
| 627,241 | Germany | Mar. 11, 1936 |